US010282659B2

(12) United States Patent
Fang et al.

(10) Patent No.: US 10,282,659 B2
(45) Date of Patent: *May 7, 2019

(54) DEVICE FOR IMPLEMENTING ARTIFICIAL NEURAL NETWORK WITH MULTIPLE INSTRUCTION UNITS

(71) Applicant: BEIJING DEEPHI INTELLIGENCE TECHNOLOGY CO., LTD., Beijing (CN)

(72) Inventors: Shaoxia Fang, Beijing (CN); Lingzhi Sui, Beijing (CN); Qian Yu, Beijing (CN); Junbin Wang, Beijing (CN); Yi Shan, Beijing (CN)

(73) Assignee: BEIJING DEEPHI INTELLIGENT TECHNOLOGY CO., LTD., Beijing (CN)

( * ) Notice: Subject to any disclaimer, the term of this patent is extended or adjusted under 35 U.S.C. 154(b) by 9 days.

This patent is subject to a terminal disclaimer.

(21) Appl. No.: 15/600,807

(22) Filed: May 22, 2017

(65) Prior Publication Data

US 2018/0307974 A1   Oct. 25, 2018

(30) Foreign Application Priority Data

Apr. 19, 2017   (CN) .......................... 2017 1 0258566

(51) Int. Cl.
| G06N 3/063 | (2006.01) |
| G06F 17/15 | (2006.01) |
| G06F 7/544 | (2006.01) |
| G06N 3/04 | (2006.01) |
| G06N 3/08 | (2006.01) |

(52) U.S. Cl.
CPC .......... *G06N 3/063* (2013.01); *G06F 7/5443* (2013.01); *G06F 17/153* (2013.01); *G06N 3/049* (2013.01); *G06N 3/08* (2013.01)

(58) Field of Classification Search
None
See application file for complete search history.

(56) References Cited

U.S. PATENT DOCUMENTS

| 7,818,541 B2 * | 10/2010 | Rhoades ................... G06F 1/10 712/10 |
| 8,935,651 B1 * | 1/2015 | Ku ........................ G06F 17/505 716/107 |
| 9,553,590 B1 * | 1/2017 | Manohararajah .. H03K 19/1737 |
| 2007/0094481 A1 * | 4/2007 | Snook .................... G06N 3/063 712/200 |
| 2016/0179434 A1 * | 6/2016 | Herrero Abellanas ..................... G06F 17/153 711/155 |
| 2017/0103302 A1 * | 4/2017 | Henry ..................... G06F 15/82 |
| 2017/0103312 A1 * | 4/2017 | Henry ..................... G06F 15/82 |

* cited by examiner

*Primary Examiner* — Eric Coleman
(74) *Attorney, Agent, or Firm* — IPro, PLLC

(57) ABSTRACT

The present disclosure relates to a processor for implementing artificial neural networks, for example, convolutional neural networks. The processor includes a memory controller group, an on-chip bus and a processor core, wherein the processor core further includes a register map, a first instruction unit, a second instruction unit, an instruction distributing unit, a data transferring controller, a buffer module and a computation module. The processor of the present disclosure may be used for implementing various neural networks with increased computation efficiency.

12 Claims, 10 Drawing Sheets

DEVICE FOR IMPLEMENTING ARTIFICIAL NEURAL NETWORK WITH MULTIPLE INSTRUCTION UNITS

CROSS REFERENCE TO RELATED APPLICATIONS

This application claims priority to Chinese Patent Application Number 2017102585668 filed on Apr. 19, 2017, the entire contents of which are incorporated herein by reference.

TECHNICAL FIELD

The present disclosure aims to provide a device for accelerating the implementation of an artificial neural network, for example, Convolutional Neural Network (CNN), so as to improve the efficiency of neural network operations.

BACKGROUND ART

Artificial neural network (ANN), in particular, convolutional neural network (CNN) has achieved great success in various fields. For example, in the field of computer vision (CV), CNN is widely used and most promising.

State-of-the-Art CNN Models

In ILSVRC 2012, the SuperVision team won the first place in image classification task using AlexNet by achieving 84.7% top-5 accuracy. CaffeNet is a replication of AlexNet with minor changes. Both of AlexNet and CaffeNet consist of 5 CONV layers and 3 FC layers.

The Zeiler-and-Fergus (ZF) network achieved 88.8% top-5 accuracy and won the first place in image classification task of ILSVRC 2013. The ZF network also has 5 CONV layers and 3 FC layers.

FIG. 1 shows a typical convolutional neural network model.

As shown in FIG. 1, a typical CNN consists of a number of layers that run in sequence.

The parameters of a CNN model are called "weights". The first layer of a CNN reads an input image and outputs a series of feature maps. The following layers read the feature maps generated by previous layers and output new feature maps. Finally a classifier outputs the probability of each category that the input image might belong to.

CONV layer and FC layer are two essential types of layer in CNN. After CONV layers, there are usually pooling layers.

For a CNN layer, $f_j^{in}$ denotes its j-th input feature map, $f_i^{out}$ denotes the i-th output feature map, and $b_i$ denotes the bias term to the i-th output map.

For CONV layers, $n_{in}$ and $n_{out}$ represent the number of input and output feature maps respectively.

For FC layers, $n_{in}$ and $n_{out}$ are the length of the input and output feature vector.

A CONV layer takes a series of feature maps as input and convolves with convolutional kernels to obtain the output feature map.

A nonlinear layer, which applies nonlinear activation function to each element in the output feature maps is often attached to CONV layers.

The CONV layer can be expressed with Equation 1:

$$f_i^{out} = \sum_{j=1}^{n_{in}} f_j^{in} \otimes g_{i,j} + b_i \quad (1 \leq i \leq n_{out}) \qquad (1)$$

where $g_{i,j}$ is the convolutional kernel applied to j-th input feature map and i-th output feature map.

FC layer applies a linear transformation on the input feature vector:

$$f^{out} = Wf^{in} + b \qquad (2)$$

where W is an $n_{out} \times n_{in}$ transformation matrix and b is the bias term. It should be noted, for the FC layer, the input is not a combination of several 2-D feature maps but just a feature vector. Consequently, in Equation 2, the parameter $n_{in}$ and $n_{out}$ actually corresponds to the lengths of the input and output feature vector.

Pooling layer, which outputs the maximum or average value of each subarea in each feature maps, is often attached to the CONV layer. Max-pooling can be expressed as Equation 3:

$$f_{i,j}^{out} = \max_{p \times p} \begin{pmatrix} f_{m,n}^{in} & \cdots & f_{m,n+p-1}^{in} \\ \vdots & & \vdots \\ f_{m+p-1,n}^{in} & \cdots & f_{m+p-1,n+p-1}^{in} \end{pmatrix} \qquad (3)$$

where p is the pooling kernel size. This non-linear "down sampling" not only reduces the feature map size and the computation for later layers, but also provides a form of translation invariance.

Compared to conventional algorithms, CNN requires larger computation amount and bandwidth. In prior art, it typically uses a CPU (Central Processing Unit) or GPU (graphic processing unit) to implement a CNN. However, CPU or GPU fails to fully adapt to the characteristics of CNN, leading to lower computation efficiency and higher power consumption and cost.

Therefore, it is desired to develop an accelerator for neural networks which addresses the above mentioned problems.

SUMMARY

According to the present disclosure, it proposes a processor for implementing an artificial neural network. The processor comprises: a memory controller group, which includes one or more memory controller, wherein each memory controller is configured for accessing a corresponding external storage chip, said external storage chip being configured for storing neural network data and instructions; an on-chip bus, configured for communicating between the memory controller group and a processor core array; and a processor core array, which includes one or more processor core, wherein each processor core further comprises: a register map, configured for configuring operation parameters of the processor core and obtaining operation status of the processor core; a first instruction unit, configured for obtaining and decoding instructions stored in the external storage chip; a second instruction unit, configured for obtaining and decoding instructions stored in the external storage chip; an instruction distributing unit, configured for selectively launching one of the first instruction unit and the second instruction unit, and obtaining the decoded result of said one of the first instruction unit and the second instruction unit; a data transferring controller, configured for writing the neural network data received from the external storage chip into a data writing scheduling unit based on the decoded result, and for writing computation results of a computation module back to the external storage chip; a buffer module, configured for storing the neural network data and the computation results of the computation module, said computation result including intermediate computation result and final computation result; and a computation module, which includes one or more computation unit, each configured for performing operations of the neural network.

BRIEF DESCRIPTION OF THE DRAWINGS

In order to illustrate the solutions of embodiments of the present disclosure more clearly, the drawings used in connection with the embodiments will be briefly described below. It should be understood that the following drawings illustrate only certain embodiments of the present disclosure, and the scope of the present disclosure is not limited thereto. In the drawings.

EMBODIMENTS OF THE INVENTION

The present disclosure will now be described more comprehensively hereinafter with reference to the accompanying drawings, in which various exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Previous Research Products of the Applicant

The Applicant (or Assignee) has previously proposed the following hardware designs specialized for implementing a CNN model.

Figure 1:
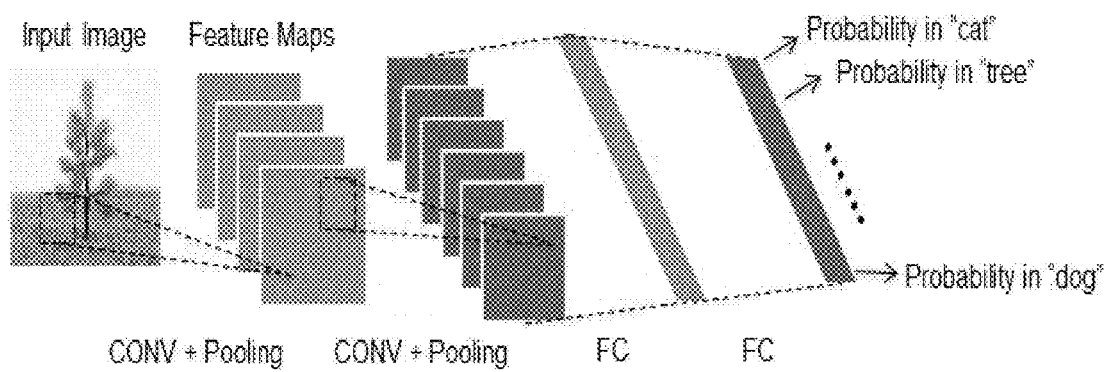
FIG. 1 is a schematic diagram showing a typical convolutional neural network model.
Figure 2A:
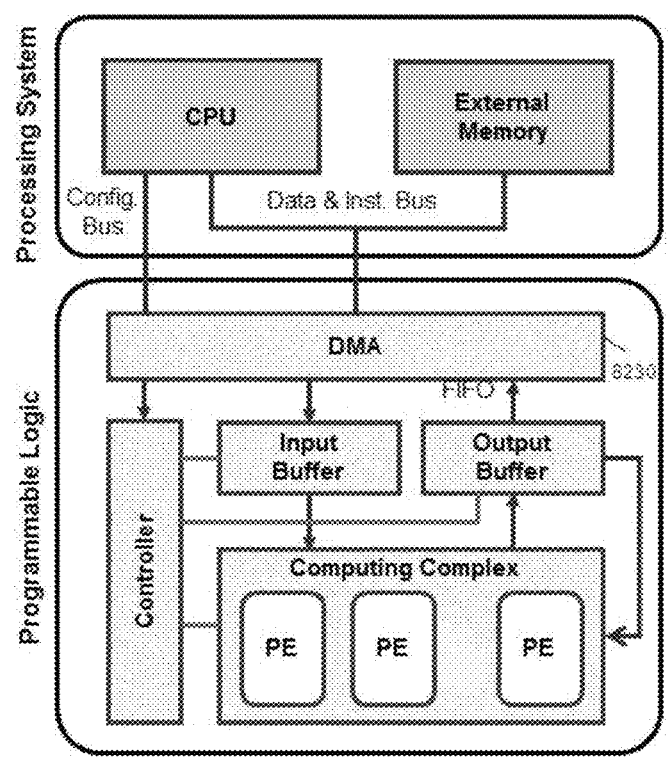
FIGS. 2a and 2b shows an exemplary hardware design specialized for implementing the CNN model shown in FIG. 1.
Figure 2B:
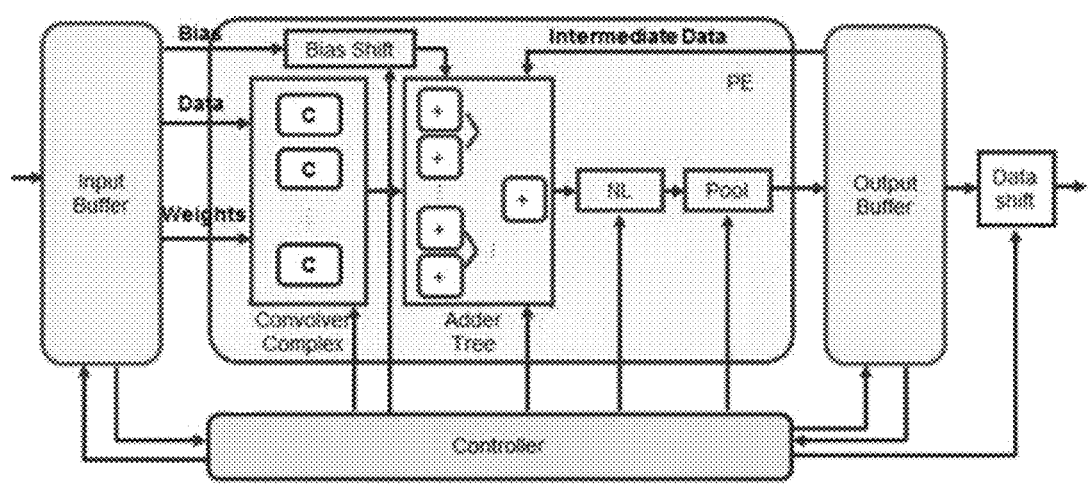

FIGS. 2a and 2b show an exemplary hardware structure design specialized for implementing a CNN model.

As can be seen from FIG. 2a, the whole system can be divided into two parts: the Programmable Logic (PL) and the Processing System (PS).

The Programmable Logic is typically implemented by a FPGA chip, on which we place the Computing Complex, On-chip Buffers, Controller and Direct Memory Access (DMA).

The Computing Complex consists of Processing Elements (PEs) which is in charge of the majority of computation tasks in CNN, including CONV layers, Pooling layers, and FC layers.

On-chip Buffers include input buffer and output buffer, which are used prepare data to be used by PEs and store the results.

Controller fetches instructions from the external memory and decodes them to orchestrate all the modules except DMAs on the PL.

DMAs are used for transferring data and instructions between the external memory on the PS side and the On-chip Buffers on the PL side.

The Processing System typically consists of general-purpose processors (e.g., CPU) and an external memory.

The external memory stores all the neural network model parameters, data, and instructions.

Processors (CPU) run bare-metal programs and help to orchestrate the whole inference phase by configuring the DMAs of said PL.

In one embodiment, the PS and PL may be implemented in one single FPGA chip, which may be desirably configured as shown in FIG. 2a.

Further, it is desirable to realize Softmax function on CPU considering that its FPGA implementation will bring inevitable design overhead with little performance improvement since this function is called only in the last layer of the whole CNN.

According to the hardware structure shown in FIG. 2a, the complete inference process of an image with the proposed hardware structure consists of three steps that are executed in sequence: data preparation, data processing, and result output.

Data Preparation.

In this phase, all the data needed in the computation including image data, model data, and control data are stored in the external memory. Control data includes the Buffer Descriptors (BD) used by DMAs and instructions used by Controller. So far the image data is not obtained from the camera.

Data Processing.

When all the data are prepared, CPU host starts to configure DMAs with the BDs that are pre-stored in the external memory. The configured DMA loads data and instructions to the controller, triggers a computation process on PL. Each time a DMA interrupt is asserted, CPU host adds up the self-maintained pointer address for each DMA's BD list and configures them with new BDs. This phase works until the last BD has been transferred.

Result Output.

After receiving the interrupt of the last BD from DMA, the processor host applies Softmax function to the final results from PEs, and output the results.

FIG. 2b shows the architecture of the PEs shown in FIG. 2a.

As can be seen from FIG. 2b, a PE consists of five parts, including the Convolver Complex, the Adder Tree, the Non-linear module, the Max-Pooling module, the Bias Shift module and the Data Shift module.

Convolver Complex employs the classical line buffer design. When Input Data goes through the buffer in row-major layout, the line buffer releases a window selection function on the input image. Thus the selected window followed by multipliers and an adder tree will compute the convolution result, one data per cycle.

Adder Tree (AD) sums all the results from convolvers. It can add the intermediate data from Output Buffer or bias data from Input Buffer if needed.

Non-linear (NL) module applies non-linear activation function to the input data stream. Said NL function might be a ReLU.

Max-Pooling module utilizes the line buffers, for example, to apply the specific 2×2 window to the input data stream, and outputs the maximum among them.

Bias Shift module and Data Shift module are designed to support dynamic quantization. Input bias will be shifted by Bias Shift according to the layer's quantization result.

With the hardware structure shown in FIGS. 2a and 2b, the computation ability of the device for implementing a CNN can be optimized, reducing processing time.

Figure 3:
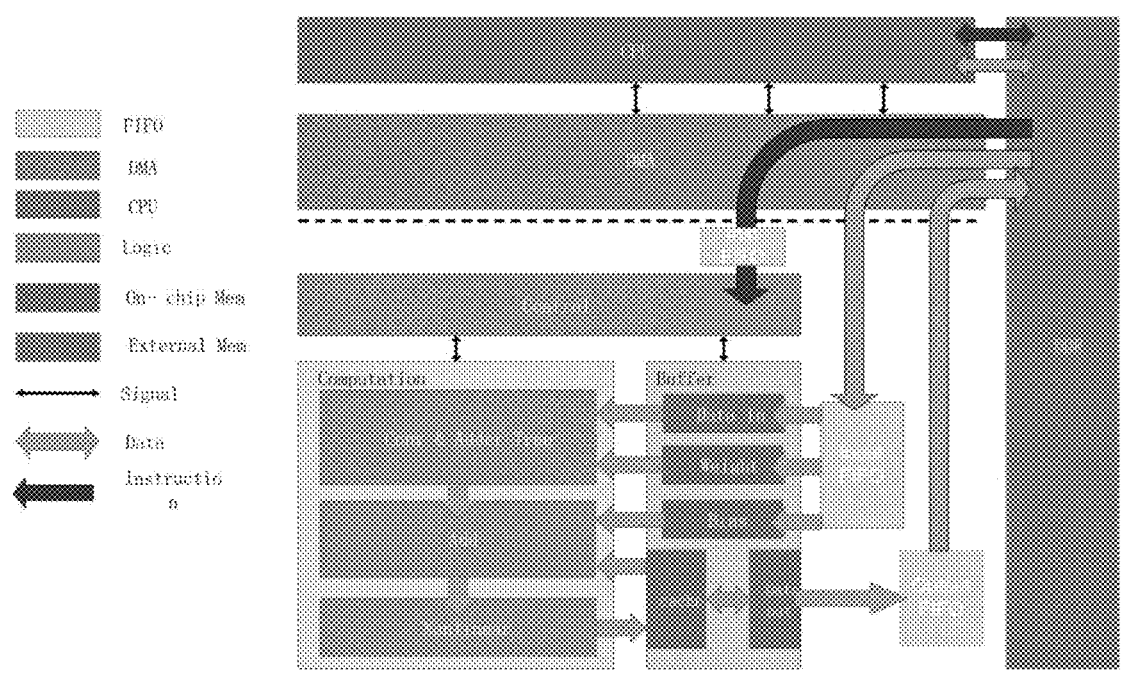
FIG. 3 shows another exemplary hardware design specialized for implementing the CNN model shown in FIG. 1.

FIG. 3 shows another exemplary hardware structure design specialized for implementing a CNN model, which is also a variant of the design of FIG. 2.

In FIG. 3, CPU and DDR correspond to the processing system (PS) of FIG. 2, wherein DDR corresponds to the external memory of FIG. 2.

In FIG. 3, controller, computation complex, buffer correspond to the programmable logic (PL) of FIG. 2. Said PL may also be referred as a "special neural network processing unit" hereinafter, which is in contrast to the general processing unit, a CPU.

In addition, as DMA is directly controlled by CPU, DMA is considered to be part of the PS from the operational aspect, which is different from FIG. 2.

In FIG. 3, CPU controls the DMA, wherein DMA is responsible for instructions communication. Specifically, under the control of CPU, DMA transmit instructions from the external memory (e.g., DDR) to the FIFO unit. Then, PL (e.g., controller) gets instructions from FIFO for subsequent operations.

CPU also controls the DMA for data communication. Specifically, under the control of CPU, DMA transmit data from the external memory (e.g., DDR) to the another FIFO unit. Then, PL (e.g., buffer) gets data from FIFO for subsequent operations by the computational complex. In a similar manner, the output data from PL is transmitted to DDR via another FIFO.

In FIG. 3, it shows an input FIFO and an output FIFO at the PL side.

In running a neural network, CPU needs to monitor the status of DMA in real time. When the input FIFO is not full, the DMA transmits data from DDR to the input FIFO. When the output FIFO is not empty, the DMA transmit data from output FIFO to the DDR.

In addition, as shown in FIG. 3, more details of the controller, computation complex, and buffer at the PL side are explained below.

The computation complex comprises a convolver, an adder tree, a NL module.

The size of convolver usually has only several options such as 3×3, 5×5, and 7×7. For example, the 2D convolvers are designed for convolution operation only over a 3×3 window.

Adder Tree (AD) sums all the results from convolvers. It can add the intermediate data from Output Buffer or bias data from Input Buffer if needed.

Non-Linearity (NL) module applies non-linear activation function to the input data stream. Said NL function might be a ReLU.

Max-Pooling module utilizes the line buffers to apply the specific 2×2 window to the input data stream, and outputs the maximum among them.

As shown in FIG. 3, the buffer comprises an input buffer (data in), an output buffer (data out) and a Bias Shift (bias). The Input Buffer stores the input image data. The Output Buffer saves the results generated from convolvers and offers intermediate results to the convolvers at proper time. In addition, the buffer might comprise a weight buffer for storing weights of neural network.

Bias Shift module is designed to support dynamic quantization. For example, weight will be shifted by Bias Shift according to the layer's quantization result. In addition, it may provide a Data shift (not shown), which is configured for data shifting in fixed-point data quantization.

In certain embodiment, instead of having separate input data buffer and weight buffer, the input buffer further comprises an input data buffer and a weight buffer. Said weight buffer is for storing weights of the ANN. Said input data buffer might be a line data buffer, for storing data and holding the data with delayers in order to reuse the data.

Further Improvement of the Present Disclosure

In the present disclosure, the Applicant further propose an improved solution designed for implementing artificial neural networks, for example, CNN. It aims at achieving higher computation efficiency by adapting to the feature of neural networks.

Figure 4:
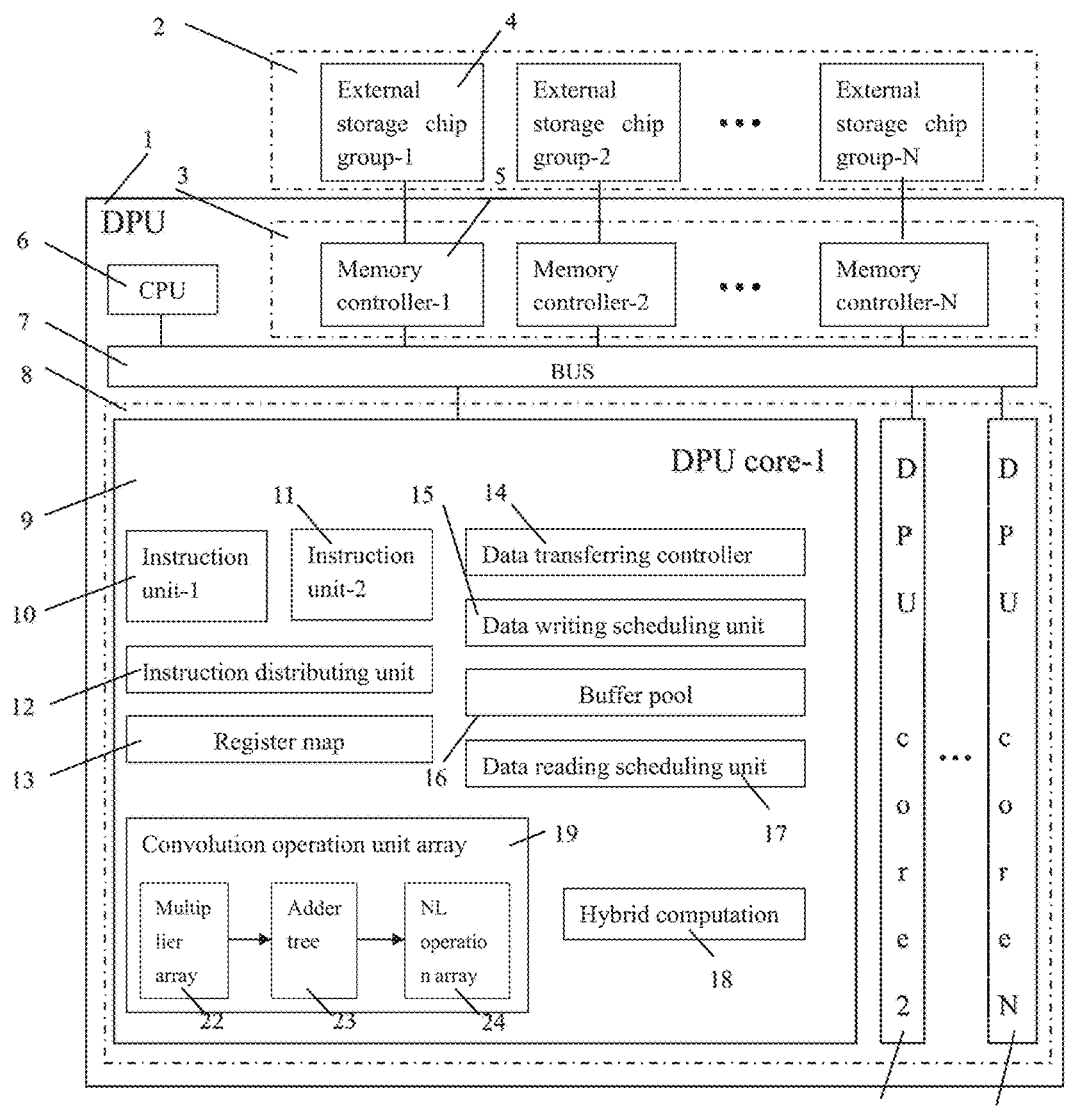
FIG. 4 shows a proposed deep processing unit (DPU) for implementing a CNN model according to one embodiment of the present disclosure.

FIG. 4 shows the proposed DPU for implementing a CNN model according to one embodiment of the present disclosure.

As can be seen from FIG. 4, the device according to the present disclosure comprises a Deep Learning Processor Unit 1 (referred as "DPU" hereinafter) and an external storage chip array 2, both of which communicate with each other via a high speed interface.

Figure 5:
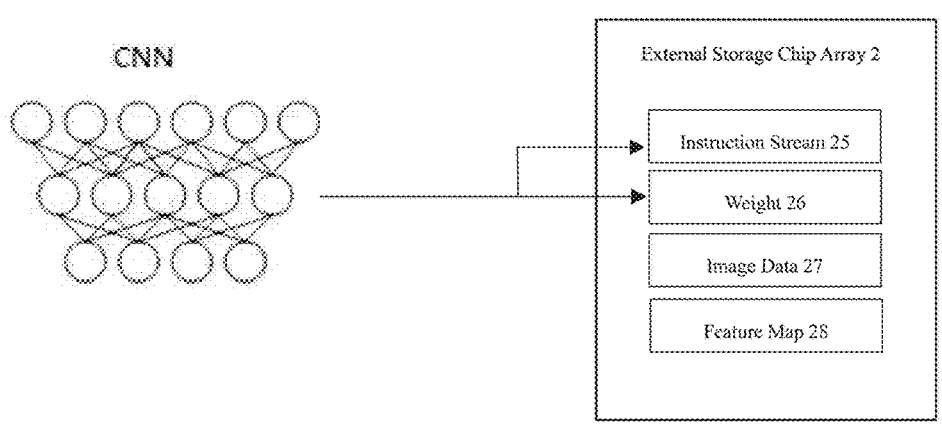
FIG. 5 shows the composition of external storage chip, which is a part of the DPU for implementing a CNN model as shown in FIG. 4 according to one embodiment of the present disclosure.

FIG. 5 shows more details of the external storage chip array 2 of the device shown FIG. 4.

It is known that a trained CNN model consists of a network topology and network parameters. As mentioned above, the parameters of a CNN model is called "weights".

As can be seen from FIG. 5, a compiler compiles the network topology into instruction streams 25. The instruction streams 25, the network parameters 26, the image data 27 and the feature maps 28 (i.e. intermediate computation results) are stored in the external storage chip array 2.

Returning to FIG. 4, DPU 1 includes a CPU 6, a memory controller group 3, an on-chip high speed bus 7 and a DPU core array 8, wherein each component communicates with each other via the high speed bus 7.

In one embodiment, the memory controller group 3 may include M memory controller (1, 2, . . . , M). Each memory controller may control a corresponding external storage chip group. For example, the memory controller-1 (indicated by reference numeral 5) may be used to fetch or store data from the corresponding external storage chip group-1 (indicated by reference numeral 4). It should be understood that the number of memory controllers and external storage chip groups may be configured according to actual needs, which are not limited by the embodiments of the present disclosure.

The CPU 6 is configured for writing the base address of an instruction stream 25 into the register map 13 and launching the DPU; for receiving signals indicting that the DPU has completed its task and further analyzing the computation result of the DPU; and for executing other non-CNN tasks.

The DPU core array 8 may comprise one or more DPU cores. For example, in the present embodiment, the DPU core array 8 comprises N DPU cores (9, 20, 21 . . . ). It should be understood that the number of DPU cores may be configured according to actual needs, which is not limited by the embodiments of the present disclosure.

By arranging a plurality of DPU cores in the DPU core array, the DPU according to the present embodiment may support parallel execution of multiple images and various algorithms, thus, improving the paralleling processing ability of the device.

More specifically, as can be seen in FIG. 4, each DPU core 9 may comprise one or more instruction unit 10 or 11, an instruction distribution unit 12, a register map 13, a data transferring controller 14, a data writing scheduling unit 15, a buffer pool 16, a data reading scheduling unit 17, and a computation module (18, 19) comprising one or more computation unit.

The register map 13 is configured for storing temporarily the base address of an instruction steam 15 and other auxiliary configuration information needed by the DPU. Moreover, the CPU may obtain the working state of each DPU from the register map 13.

The instruction unit 10 or 11 is configured for obtaining an instruction stream 25, decoding and analyzing the instruction and transferring the decoded result to the instruction distribution unit 12.

Figure 6:
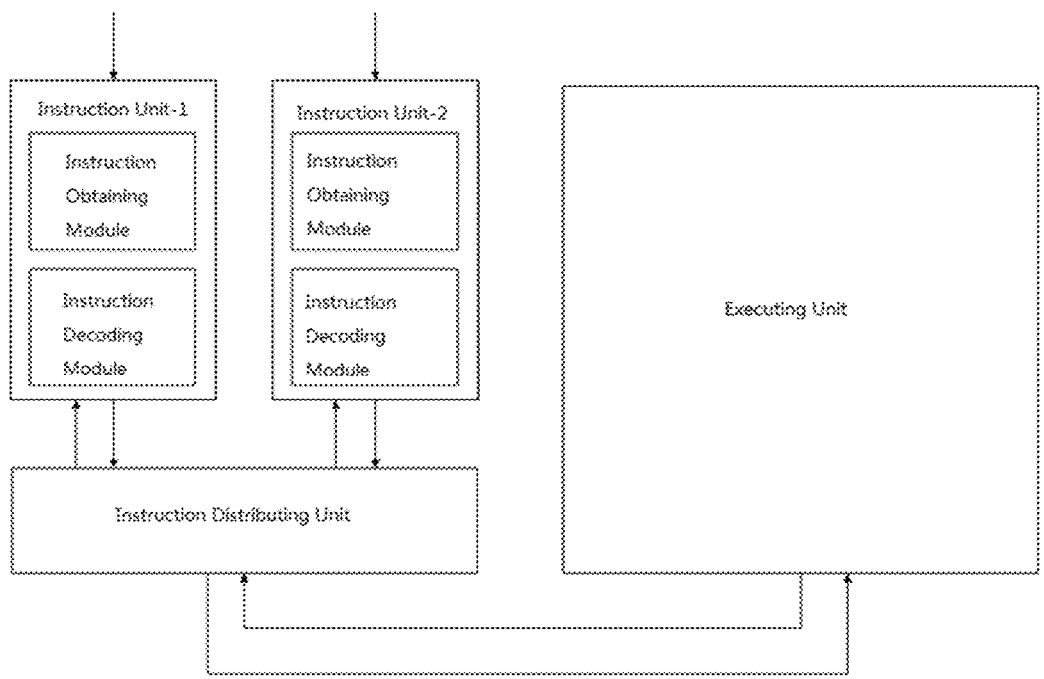
FIG. 6 shows the internal structure and the working mechanism of the two instruction units and one instruction distributing unit shown in FIG. 4 according to one embodiment of the present disclosure.

FIG. 6 shows the internal structure and the working mechanism of the two instruction units and one instruction distributing unit in more detail.

As shown in FIG. 6, the instruction unit 10 and 11 may comprise an instruction obtaining module and an instruction decoding module, wherein the instruction obtaining module is configured for requesting the high speed bus for instructions stored in the external storage chip group, and the instruction decoding module is configured for decoding and analyzing the instruction obtained by the instruction obtaining module.

As shown in FIG. 6, the instruction distribution unit 12 is configured for parsing the decoded result of the instruction decoding module into control signals for each executing unit, and transferring the control signals to the corresponding executing unit. The executing unit may include the data transferring controller 14, the data writing scheduling unit 15, the buffer pool 16, the data reading scheduling unit 17, and said one or more computation unit 18 and 19.

In one embodiment, the DPU core 9 may include a plurality of instruction units (10, 11, . . . ) to improve parallel capacity. As can be seen from FIG. 6, the DPU core 9 may include an instruction unit-1 and an instruction unit-2. Each instruction unit comprises an instruction obtaining module and an instruction decoding module, communicating with the instruction distributing unit separately. The instruction distributing unit in turn communicates with each executing unit, so as to transfer the control signals to corresponding executing units.

In this configuration, when the device is executing the instruction steam in the instruction unit-1, if the executing unit pauses due to access delay or other reasons, the instruction distributing unit 12 may stop the instruction unit-1 and initiate the other instruction unit-2. More specifically, the instruction distributing unit may send a maintenance signal and initiate the instruction unit-2, so as to obtain the instruction steam in the instruction unit-2 and continue the process.

By arranging two instruction units in the DPU core, the computation efficiency of the processor may be increased.

More specifically, conventional processors usually improves its computation efficiency by improving the clock frequency and on-chip buffer capacity. However, in actual practice, the executing unit may not be fully exploited due to reasons such as resource conflicts, data dependency, which limits the efficiency of processor.

However, in the embodiment of the present disclosure, by arranging a plurality instruction units (in this case, two instruction units) in the DPU core, the processor may obtain two independent instruction steams concurrently, eliminating the dependency between different instructions. Moreover, when the execution of one instruction steam pauses, the processor may switch to execute the other instruction stream. In this way, a plurality of instruction steams may share the same computation unit, so that the computation unit will be in operating status (rather than idle or waiting mode) as much as possible, maximizing its efficiency.

It should be understood that, considering the balance between computing resources and efficiency, the DPU core in this embodiment supports two instruction units. However, the DPU core may support one, two or more instruction units according to actual needs, which is not limited by the embodiments of the present disclosure.

Returning to FIG. 4, in this embodiment, the data transferring controller 14 is configured to interact with the high speed bus 7, the data writing scheduling unit 15 and the data reading scheduling unit 17.

More specifically, when uploading external data, the data is transferred from the external storage chip to the data writing scheduling unit via the memory controller, the bus and the data transferring controller. On the other hand, when storing data, the data is transferred from the data reading scheduling unit to the external storage chip via the data transferring controller, the bus and the memory controller.

The data writing scheduling unit 15 is configured for writing neural network data and the computation result of the computation unit into the buffer pool 16.

The buffer pool 16 is configured for storing the neural network data and the computation result of the computation unit, including intermediate computation result and final computation result.

The data reading scheduling unit 17 is configured for reading data needed for computation and the computation result of the computation unit from the buffer pool 16, and transferring the data and the computation result to a corresponding executing unit.

Figure 7:
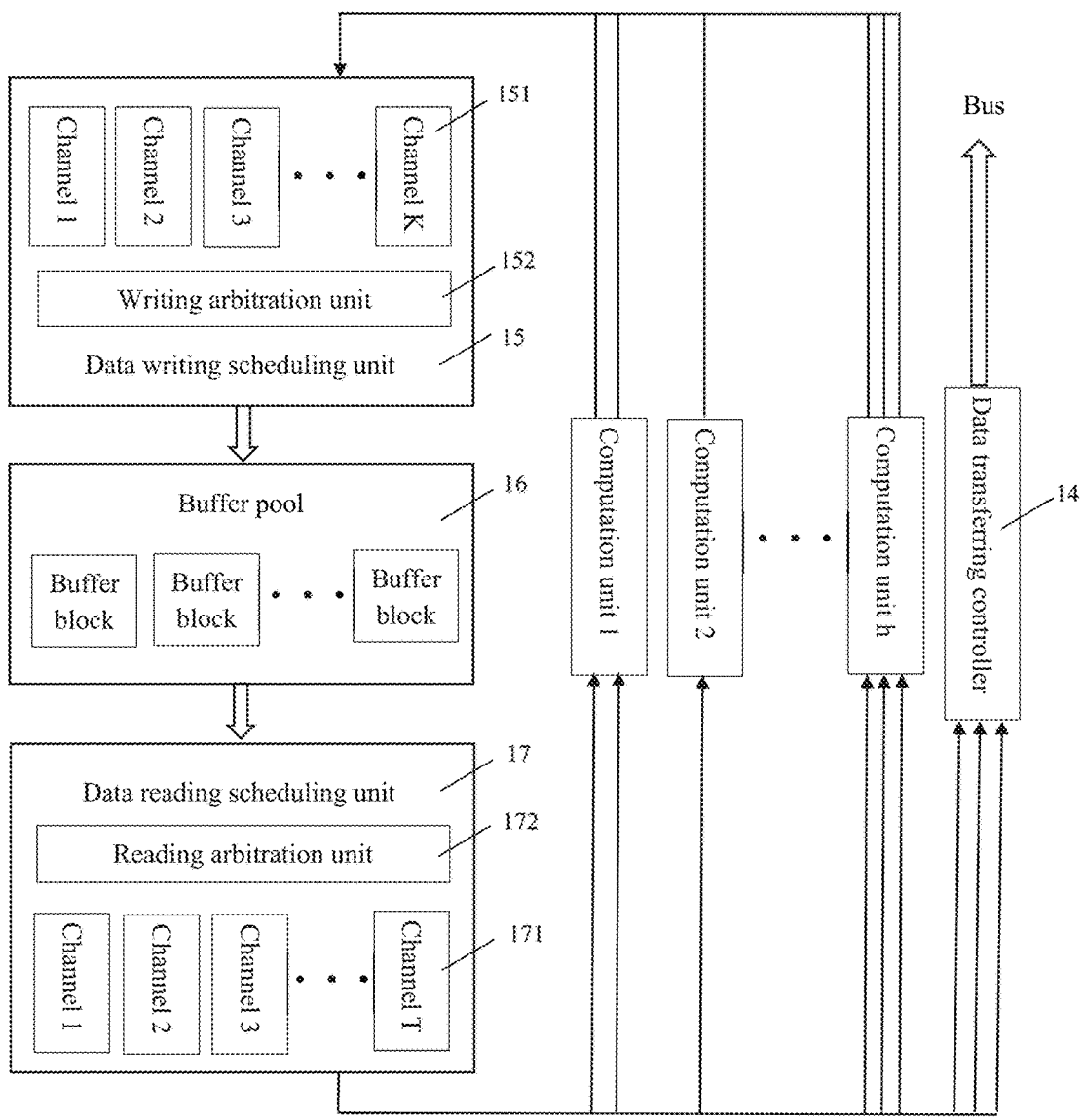
FIG. 7 shows the internal structure and the working mechanism of the data writing scheduling unit, the buffer pool, and the data reading scheduling unit shown in FIG. 4 according to one embodiment of the present disclosure.

FIG. 7 shows the internal structure and the working mechanism of the data writing scheduling unit, the buffer pool, and the data reading scheduling unit in more detail.

As can be seen from FIG. 7, the data reading scheduling unit 15 may include a writing scheduler of K channels 151 and a writing arbitration unit 152.

The buffer pool 16 may include a plurality of buffer blocks.

The data reading scheduling unit 17 may include a reading scheduler of T channels 171 and a reading arbitration unit 172.

It should be understood that the number of channels of the writing scheduler and the reading scheduler as well as the number of the buffer blocks may be configured according to actual needs, which are not limited by the embodiments of the present disclosure.

The channels of the data reading scheduling unit 17 are independent with each other, and are configured for connecting with the input of various computation units. The channels of the data writing scheduling unit 15 are also independent with each other, and are configured for connecting with the output of various computation units. The type of operation performed by the computation unit may include but not limited to convolution operation, summing operation, non-linear operation, pooling operation, element-wise operation, resizing operation, full connected operation, etc.

Moreover, the input of the data transferring controller 14 may occupy a few channels of the data reading scheduling unit 17 so as to transfer the data to the memory controller group 3 via the high speed bus 7. It should be understood that the number of channels occupied by the data transferring controller be configured according to actual needs, which is not limited by the embodiments of the present disclosure.

According to this configuration, when each computation unit wants to write its computation result into different locations of the buffer pool and/or read out data in different locations of the buffer pool, the writing and/or reading process may be executed concurrently without interfering each other, thanks to the independent channels of the data writing scheduling unit and/or the data reading scheduling unit.

When each computation unit wants to write its computation result into the same location of the buffer pool and/or read out data in the same location of the buffer pool, the arbitration unit of the data writing scheduling unit and/or the data reading scheduling unit will arbitrate according to the priority of each channel, which is determined in advance for example. In this way, channels with higher priority will be clear while channels with lower priority will be blocked temporally. Accordingly, the writing and/or reading process may be executed in a queue. In this embodiment, the arbitration unit uses priority as the arbitration rule, however it should be understood that other arbitration rules may also be adopted, which are also comprised in the scope of the present disclosure.

With this configuration, the on-chip buffer resources may be utilized to its maximum.

More specifically, conventional processor usually adopts an input buffer->computation complex->output buffer structure. With this kind of configuration, once the size of each buffer is determined, the circuit cannot be modified during actual implementation. However, since the CNN is characterized in that: its superficial layers have more input data, intermediate computation results, output data and less weights, while its deep layers have less input data, intermediate computation results, output data and more weights, it is desired that the buffer size may dynamically adapt to the characteristics of the CNN algorithm.

In the present disclosure, the DPU core no longer adopts the traditional input buffer->computation complex->output buffer structure. Instead, it proposes a novel structure, including: a buffer pool, a multi-channeled data writing scheduling unit and a multi-channeled data reading scheduling unit. With this kind of configuration, the DPU may support concurrent request for any number of writing/reading channels, and each writing/reading channel may have access to the whole buffer pool. Thus, the DPU may request, distribute and utilize the buffer space according to actual computation demand, especially considering the characteristics of the CNN algorithm. Therefore, the on-chip buffer utilization may be increased significantly.

Returning to FIG. 4, in this embodiment, the computation module in each DPU core may comprises a convolution operation unit array 19 and a hybrid computation unit 18, which are separate from each other.

The convolution operation unit array 19 may comprise one or more convolution operation units, and the number of the convolution operation units may be configured according to actual needs.

Each convolution operation unit may comprise a multiplier array, an adder tree and a non-linear operation array.

The multiplier array is configured for performing multiplication operations.

The adder tree is coupled to the multiplier array and is configured for summing results of multiplication operation.

The non-linear operation array is coupled to the adder tree and is configured for applying a non-linear function to the output of adder tree.

In the configuration where the convolution operation unit array 19 comprises a plurality of convolution operation units, since the multiplier array, the adder tree and the non-linear operation array in each convolution operation unit adopt a pipeline design and a plurality of pipelines may be executed concurrently, the number of multiplier arrays, adder trees and non-linear operation arrays arranged in the convolution operation unit array is more than that in conventional processors, and the computation ability and efficiency of the convolution operation unit array is far beyond that of conventional processors.

The hybrid computation unit 18 may include computation units for performing pooling operation, element-wise operation, resizing operation, full connected operation, etc. It should be understood that the hybrid computation unit 18 may also include other computation units for performing other operations, which are also included within the scope of the present disclosure.

As mentioned above and with reference to FIG. 7, each computation unit 18 and 19 may have its own access channel to the buffer pool, or may share a common channel with other computation units. Since the number of channels of the writing scheduler and the reading scheduler may be configured according to actual needs, the DPU of the present disclosure may support other new type of computation methods.

In actual implementation of a CNN model, since hybrid computation is configured for reprocessing the convolution operation results, by separating the convolution operation unit array 19 and the hybrid computation unit 18, the convolution operation and the hybrid computation will have no conflict in accessing buffer resources. In this way, the processor may perform parallel computation, increasing computation efficiency.

More specifically, as mentioned above, a traditional processor core usually adopts an input buffer->computation complex->output buffer structure. With this kind of configuration, its computation structure is limited to a pipeline structure of convolution operation->hybrid computation. Although this kind of computation structure is well adapted to pure convolution operation, it is less suitable for hybrid computation such as pooling operation, element-wise operation, etc.

Take a 2×2 max-pooling operation for example, where the computation unit outputs the maximum value of every 4 adjacent values of the convolution operation results. Assuming that the circuit structure of the convolution operation unit is already determined, 4×4=16 results is output per clock cycle, the 2×2 max-polling operation may be set to output 16/4=4 results per clock cycle. However, if one algorithm requires to conduct a 3×3 max-pooling operation (where the computation unit outputs the maximum value of every 9 adjacent values of the convolution operation results), the processor may fail to support this new operation, or it may have to add additional customized buffers.

However, in the present disclosure, since the DPU core adopts a novel structure including a buffer pool, a multi-channeled data writing scheduling unit and a multi-channeled data reading scheduling unit, the computation structure is no longer restricted to conventional pipeline structure. In addition, the convolution operation and the hybrid computation may be conducted independent from each other. The throughput of each computation unit may therefore be guaranteed. In this way, the flexibility and parallelism of the computation module may increase significantly.

It should be understood that other methods may be adopted to separate the convolution operation and the hybrid computation. For example, special buffers may be attributed to the convolution operation and the hybrid computation. These methods are also comprised into the scope of the present disclosure.

Figure 8:
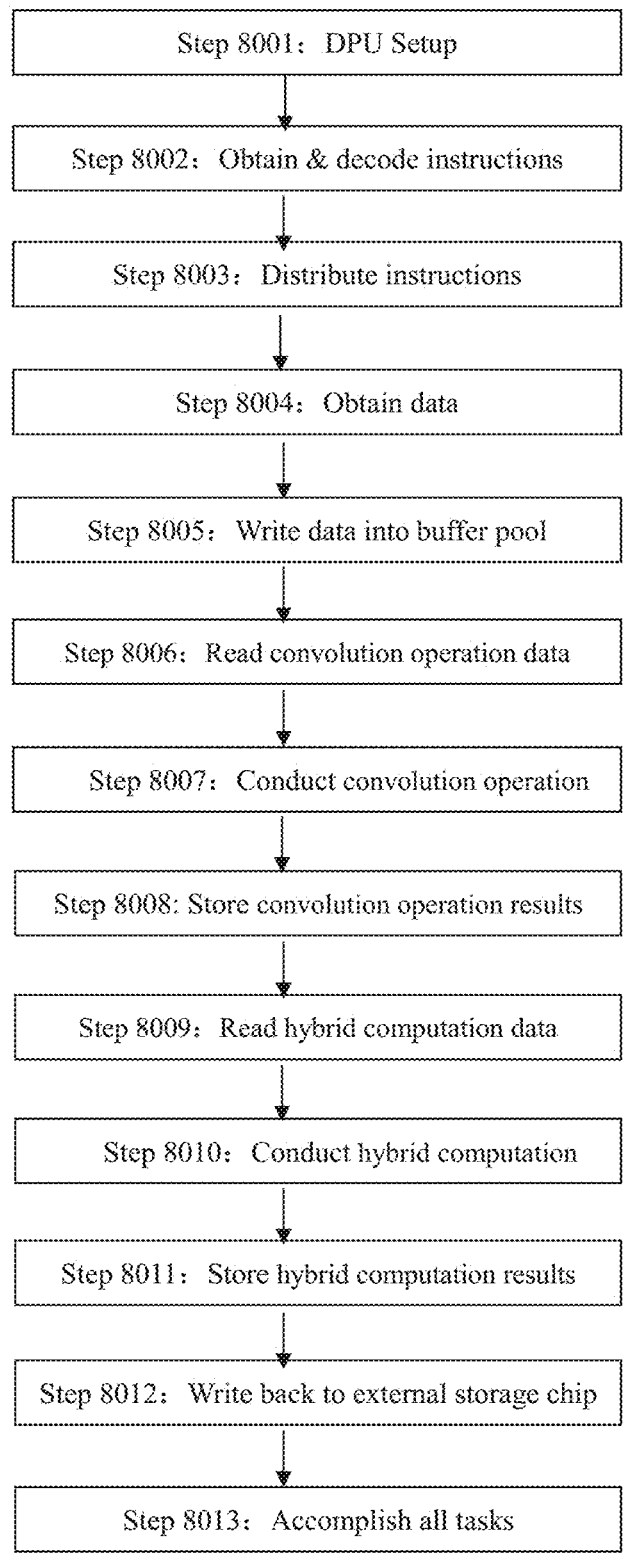
FIG. 8 shows an exemplary working process of the proposed DPU for implementing a CNN model according to one embodiment of the present disclosure.

FIG. 8 shows an exemplary working process of the proposed DPU for implementing a CNN model according to one embodiment of the present disclosure.

In Step 8001, the CPU 6 writes the base address of an instruction stream 25 into the register map 13 and then initiates the DPU 1.

In Step 8002, after initiating the DPU 1, one or more instruction units 10 and or 11 send instruction reading request to the high speed bus 7 independently, so as to request for instruction steams 25 stored in the external storage chip group 2. After obtaining the instruction, the instruction units 10 and 11 decode the instruction and sends it to the instruction distribution unit 12.

In Step 8003, the instruction distribution unit 12 parses the decoded result of the instruction unit into control signals, and transfers the control signals to corresponding executing units.

In Step 8004, the data transferring controller 14 receives the control signal form the instruction distribution unit 12, and sends a data reading request to the high speed bus 7, so as to request for weights 26, image data 27 and feature maps 28 stored in the external storage chip group 2 and then transfer the required data to the data writing scheduling unit 15.

In Step 8005, the data writing scheduling unit 15 writes the data into the buffer pool 16.

In Step 8006, the data reading scheduling unit 17 reads the data needed for convolution operation from the buffer pool 16 in pipeline manner, and then sends the data to the convolution operation unit array 19.

In Step 8007, the convolution operation unit array 19 performs convolution operation in pipeline manner, and outputs the convolution operation results to the data writing scheduling unit 15.

In Step 8008, the data writing scheduling unit 15 writes the convolution operation results back to the buffer pool 16.

In Step 8009, the data reading scheduling unit 17 reads the data needed for hybrid computation from the buffer pool 16 in pipeline manner, and then sends the data to the hybrid computation unit 18.

In Step 8010, the hybrid computation unit 18 performs pooling operation, element-wise operation, resizing operation, full connected operation and the like, and outputs the hybrid computation results to the data writing scheduling unit 15.

In Step 8011, the data writing scheduling unit 15 writes the hybrid computation results back to the buffer pool 16.

In Step 8012, the data reading scheduling unit 17 reads the data from the buffer pool 16, and then sends the data to the data transferring controller 14. The data transferring controller 14 then sends a data writing request to the high speed bus 7, so as to write the resultant data back into the specific location in the external storage chip group 2.

In Step 8013, if all the tasks are completed, the DPU core 9 will send an interrupt signal, informing the CPU 6 that the execution of instruction streams has been completed.

Although an exemplary working process of the device for implementing a CNN model has been described above, it should be understood that the steps of the working process may not necessarily to be performed in sequence. On the contrary, the steps may be performed in parallel.

Figure 9:
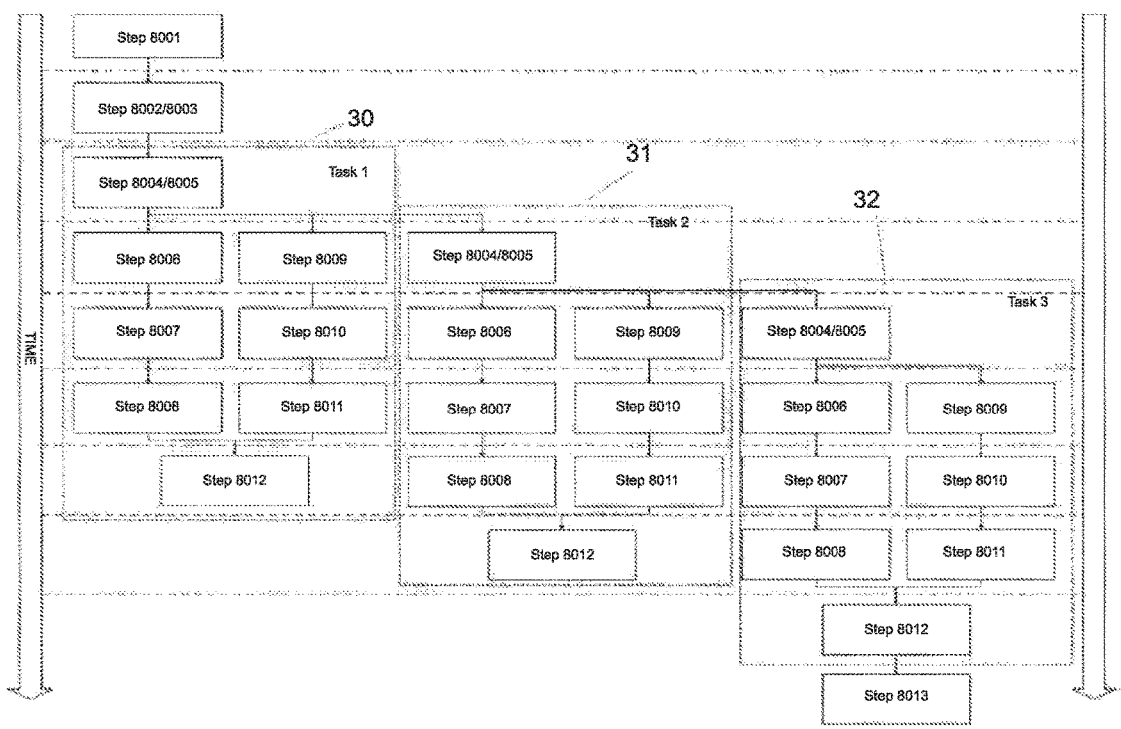
FIG. 9 shows an exemplary working process of the proposed DPU for implementing a CNN model under parallel working mode according to one embodiment of the present disclosure.

FIG. 9 shows an exemplary working process of the device for implementing a CNN model under parallel working mode according to one embodiment of the present disclosure.

As can be seen in FIG. 9, in one embodiment, the device of the present disclosure may support parallel computation within one task.

For example, in Task 1 (indicated by reference numeral 30), when performing Steps 8006, 8007 and 8008 as mentioned above (i.e. reading data needed for convolution operation from the buffer pool, performing convolution operation and writing convolution operation results back into the buffer pool), the data reading scheduling unit 17, the buffer pool 16, the convolution operation unit array 19 and the data writing scheduling unit 15 are occupied. Since the data reading scheduling unit 17, the buffer pool 16 and the data writing scheduling unit 15 support multi-channeled parallel operations, Steps 8009, 8010 and 8011 (i.e. reading data needed for hybrid computation from the buffer pool, performing hybrid computation and writing hybrid computation results back into the buffer pool) may be performed concurrently. At this time, Steps 8009, 8010 and 8011 occupy the data reading scheduling unit 17, the hybrid computation unit 18, the buffer pool 16 and the data writing scheduling unit 15.

In another embodiment, the device of the present disclosure may support parallel computation among different tasks.

For example, when performing Steps 8006 and 8009 (i.e. reading data needed for convolution operation from the buffer pool and reading data needed for hybrid computation from the buffer pool) in Task 1, the data reading scheduling unit 17 is occupied, but the data transferring controller 14 and the data writing scheduling unit 15 are not. Therefore, Steps 8004 and 8005 (i.e. acquiring data and storing the acquired data into the buffer pool) in Task 2 (indicated by reference numeral 31) may be performed concurrently.

Likewise, when performing Steps 8007 and 8010 (i.e. performing convolution operation and computing hybrid computation) in Task 1, the data reading scheduling unit 17 is not occupied. Therefore, Steps 8006 and 8009 in Task 2 may be performed concurrently. At the same time, since the data transferring controller 14 and the data writing scheduling unit 15 are not occupied, Steps 8004 and 8005 in Task 3 (indicated by reference numeral 32) may be performed concurrently.

If the computation time of each executing unit varies considerably which makes complete parallel computation impossible, once a certain executing unit is under idle state, the instruction distribution unit 12 may attribute a task immediately to this executing unit. In this way, each executing unit of the DPU may operate in full load as much as possible, maximizing the efficiency of the device.

It should be understood that although the above-mentioned embodiments use CNN as example of the present disclosure, the present disclosure is not limited to CNN, but can also be applied to various other neural networks, including but not limited to VGG, GoogleNet, AlexNet ResNet, etc.

Based on the above technical solution, the device for implementing a neural network according to the present disclosure has the following advantages:

The device according to the present disclosure may support various kinds of neural networks using corresponding compilers, which compile different algorithms into instruction streams that may be executed by the device.

Moreover, by adopting a structure with buffer pool, multi-channeled data writing scheduling unit and multi-channeled data reading scheduling unit, the buffer space distribution and computation method of the processor is more flexible. More specifically, it allows requesting, distributing and utilizing the buffer space according to actual computation demand, maximizing on-chip buffer utilization.

Also, by separating the convolution operation and the hybrid computation, and by arranging two or more instruction unit, the computation efficiency of the device may increase significantly.

It should be understood that, those skilled in the art may understand and implement other variations to the disclosed embodiments from a study of the drawings, the present disclosure, and the appended claims.

In the claims, the word "comprising" does not exclude other elements or steps, and the indefinite article "a" or "an" does not exclude a plurality.

In applications according to present disclosure, one element may perform functions of several technical feature recited in claims.

Any reference signs in the claims should not be construed as limiting the scope. The scope and spirit of the present disclosure is defined by the appended claims.

What is claimed is:

1. A processor for implementing an artificial neural network, comprising:
   a memory controller group, which includes one or more memory controller, wherein each memory controller is configured for accessing a corresponding external storage chip, said external storage chip being configured for storing neural network data and instructions;
   an on-chip bus, configured for communicating between the memory controller group and a processor core array; and
   a processor core array, which includes one or more processor core, wherein each processor core further comprises:
      a register map, configured for configuring operation parameters of the processor core and obtaining operation status of the processor core;
      a first instruction unit, configured for obtaining and decoding instructions stored in the external storage chip;
      a second instruction unit, configured for obtaining and decoding instructions stored in the external storage chip;
      an instruction distributing unit, configured for selectively launching one of the first instruction unit and the second instruction unit, and obtaining the decoded result of said one of the first instruction unit and the second instruction unit;
      a data transferring controller, configured for writing the neural network data received from the external storage chip into a data writing scheduling unit based on the decoded result, and for writing computation results of a computation module back to the external storage chip;
      a buffer module, configured for storing the neural network data and the computation results of the computation module, said computation result including intermediate computation result and final computation result; and
      a computation module, which includes one or more computation units, each configured for performing operations of the neural network.

2. The processor according to claim 1, wherein the first instruction unit further comprises:
   a first instruction obtaining unit, configured for obtaining instructions stored in the external storage chip; and
   a first instruction decoding unit, configured for decoding the instructions obtained by the first instruction obtaining unit.

3. The processor according to claim 1, wherein the second instruction unit further comprises:
   a second instruction obtaining unit, configured for obtaining instructions stored in the external storage chip; and
   a second instruction decoding unit, configured for decoding the instructions obtained by the second instruction obtaining unit.

4. The processor according to claim 1, wherein the instruction distributing unit further parses the decoded result of the first instruction unit or the second instruction unit.

5. The processor according to claim 1, wherein when the executing process of one of the first instruction unit and the second instruction unit has been delayed, the instruction distributing unit stops said one of the first instruction unit and the second instruction unit and initiates the other of the first instruction unit and the second instruction unit.

6. The processor according to claim 1, wherein the computation module further comprises:
   a convolution operation unit array, which comprises a plurality of convolution operation units, each of which being configured for performing convolution operation and obtaining convolution operation results; and
   a hybrid computation unit, configured for performing hybrid computation and obtaining hybrid computation results.

7. The processor according to claim 6, wherein the convolution operation unit further comprises:
   a multiplier array, configured for performing multiplication operations and obtaining multiplication operation results;
   an adder tree, coupled to the multiplier array and configured for summing the multiplication operation results; and
   a non-linear operation array, coupled to the adder tree and configured for applying a non-linear function to the output of adder tree.

8. The processor according to claim 6, wherein the hybrid computation unit further comprises computation units for performing pooling operation, element-wise operation, resizing operation, full connected operation.

9. The processor according to claim 1, wherein the buffer module further comprises:
   a buffer pool, configured for storing the neural network data and the computation results of the computation module, said computation result including intermediate computation result and final computation result;
   a data writing scheduling unit, configured for writing the neural network data and the computation results of the computation module into the buffer pool;
   a data reading scheduling unit, configured for reading data needed for computation and the computation results of the computation module from the buffer pool.

10. The processor according to claim 9, wherein the buffer pool further comprises one or more blocks of buffer.

11. The processor according to claim 9, wherein the data writing scheduling unit further comprises:
- one or more writing scheduling channel, each writing scheduling channel communicating with the output of a corresponding computation unit of said one or more computation units;
- a writing arbitration unit, configured for ranking the priority among said one or more writing scheduling channels, so as to schedule writing operations of computation results from said one or more computation units.

12. The processor according to claim 9, wherein the data reading scheduling unit further comprises:
- one or more reading scheduling channel, each reading scheduling channel communicating with the input of a corresponding computation unit of said one or more computation units;
- a reading arbitration unit, configured for ranking the priority among said one or more reading scheduling channel, so as to schedule reading operations into the input of said one or more computation units.

* * * * *